(12) United States Patent
Yoshihara et al.

(10) Patent No.: US 8,103,744 B2
(45) Date of Patent: Jan. 24, 2012

(54) CONSUMER EQUIPMENT REMOTE OPERATION SYSTEM AND OPERATING METHOD FOR THE SAME

(75) Inventors: Kiyohito Yoshihara, Fujimino (JP); Shinji Motegi, Fujimino (JP); Hiroki Horiuchi, Fujimino (JP)

(73) Assignee: KDDI Corporation, Tokyo (JP)

( * ) Notice: Subject to any disclaimer, the term of this patent is extended or adjusted under 35 U.S.C. 154(b) by 1381 days.

(21) Appl. No.: 11/464,530

(22) Filed: Aug. 15, 2006

(65) Prior Publication Data

US 2007/0067431 A1 Mar. 22, 2007

(30) Foreign Application Priority Data

Aug. 17, 2005 (JP) ................................ 2005-236558

(51) Int. Cl.
*G06F 15/16* (2006.01)
(52) U.S. Cl. ....................................................... 709/219
(58) Field of Classification Search ................... 709/219
See application file for complete search history.

(56) References Cited

U.S. PATENT DOCUMENTS

| | | | | |
|---|---|---|---|---|
| 2004/0063405 A1* | 4/2004 | Song | ............................ | 455/41.2 |
| 2005/0076150 A1* | 4/2005 | Lee et al. | ...................... | 709/249 |
| 2005/0165917 A1* | 7/2005 | Le et al. | ........................ | 709/220 |

FOREIGN PATENT DOCUMENTS

| | | |
|---|---|---|
| JP | 2001-331394 | 11/2001 |
| JP | 2002-111735 A | 4/2002 |
| JP | 2002-204486 A | 7/2002 |
| JP | 2003-208366 A | 7/2003 |
| JP | 2003-345686 | 12/2003 |
| JP | 2005-51473 A | 2/2005 |

OTHER PUBLICATIONS

Japanese Office Action dated Jun. 30, 2010, issued in corresponding Japanese Patent Application No. 2005-236558.
Stan Moyer, et al., "A Protocol for Wide-Area Secure Networked Appliance Communication", IEEE Communications Magazine, Oct. 2001, pp. 52-59.
Stan Moyer, et al., "Service Portability of Networked Appliances", IEEE Communications Magazine, Jan. 2002, pp. 116-121.

* cited by examiner

*Primary Examiner* — John Follansbee
*Assistant Examiner* — Maceeh Anwari
(74) *Attorney, Agent, or Firm* — Westerman, Hattori, Daniels & Adrian, LLP

(57) ABSTRACT

By simply connecting consumer equipments physically to a home network, configurations are set automatically for the consumer equipment, and the consumer equipment is enabled to be remote operated easily via a home gateway that is not necessarily fixed in address.
A home gateway 51 includes: a home management table 212*a* that manages equipment information of consumer equipment connected to the home network; an equipment detector 206 that cyclically transmits a detection request along the home network, detects consumer equipment, and acquires the equipment information of the detected consumer equipment; an equipment management unit 211 that updatingly registers the equipment information of the detected consumer equipment into the above-described home management table 212*a*; a DHCP server function 210*a* that sets network configurations for newly detected consumer equipment; and an equipment information registration unit that updatingly registers the equipment information in the home management table cyclically into a portal server 4.

14 Claims, 19 Drawing Sheets

Fig. 7

| DEVICE-UUID | PRESENTATION URL | FRENDLY-NAME | DEVICE-TYPE | IPv4 ADDRESS | IPv6 ADDRESS | MAC ADDRESS | AGING COUNTER |
|---|---|---|---|---|---|---|---|
| UUID1 | URL1 | NAME1 | TYPE1 | ADDRESS 1a | ADDRESS 1b | ADDRESS 1c | 0 |
| UUID2 | URL2 | NAME2 | TYPE2 | ADDRESS 2a | ADDRESS 2b | ADDRESS 2c | 1 |
| UUID3 | URL3 | NAME3 | TYPE3 | ADDRESS 3a | ADDRESS 3b | ADDRESS 3c | 2 |
| ... | ... | ... | ... | ... | ... | ... | ... |

Fig. 10

| STATUS | MAC ADDRESS | IPv4 ADDRESS | AGING COUNTER |
|---|---|---|---|
| VALID | MAC ADDRESS 1 | 192.168.0.2 | 0 |
| INVALID | MAC ADDRESS 2 | 192.168.0.3 | - (UN-DEFINED) |
| VALID | MAC ADDRESS 3 | 192.168.0.4 | 0 |
| ... | ... | ... | ... |
| VALID | MAC ADDRESS N | 192.168.0.7 | 1 |

Fig. 13

| STATUS | MAC ADDRESS | LINK LOCAL IPv6 ADDRESS | GLOBAL IPv6 ADDRESS | AGING COUNTER |
|---|---|---|---|---|
| VALID | MAC ADDRESS 1 | IPv6 ADDRESS 1 | IPv6 ADDRESS 1 | 0 |
| INVALID | MAC ADDRESS 2 | IPv6 ADDRESS 2 | IPv6 ADDRESS 2 | — (UN-DEFINED) |
| VALID | MAC ADDRESS 3 | IPv6 ADDRESS 3 | IPv6 ADDRESS 3 | 0 |
| ... | ... | ... | ... | ... |

Portal Index mode:
- ◉ LOGIN
- ○ USER REGISTRATION
- ○ USER DELETE

ID:
[          ]

PASS:
[          ]

[OK] [CANCEL]

LIST OF HOME TERMINAL EQUIPMENT

INFORMATION

LIST OF HOME TERMINAL EQUIPMENT

NETWORK CAMERA

DVD Recorder

INFORMATION

[17:46:43]:[DVD Recorder]REGISTERED
[17:46:09]:[NETWORK CAMERA]INFORMATION UPDATED

④←②↑⑧↓⑥→
⑤UPDATE

HOME POSITION

CONSUMER EQUIPMENT REMOTE OPERATION SYSTEM AND OPERATING METHOD FOR THE SAME

BACKGROUND OF THE INVENTION

1. Field of the Invention

This invention is targeted at a home network that is already provided with an ADSL (Asymmetric Digital Subscriber Line), an optical fiber line, or other communication line that is constantly connected to the Internet. This invention relates to a consumer equipment remote operation system that enables configurations to be set automatically upon simply connecting a network camera, DVD recorder, or other network-ready consumer equipment physically to the home network and without using a computer and enables remote operation of the consumer equipment via the network from a terminal inside or outside a home, and also relates to a method for putting this system into operation.

2. Description of the Related Art

Remote operation systems, with which a network-ready DVD recorder, network camera, and other consumer equipments are connected to a home network in advance and, upon setting various configurations, these consumer equipments are remotely operated from an outside location, are disclosed in Patent Documents 1 and 2.

In Patent Document 1, a home network is connected to an outdoor public line via a gateway. To perform remote operation of consumer equipment connected to the indoor network, the address of the consumer equipment is designated from a WWW browser on a mobile terminal, a dialup connection is made, and a PPP connection is established with the consumer equipment via the gateway. The WWW browser on the mobile terminal is then used to designate operation details, and when these are sent, the consumer equipment is operated according to the operation details received by a WWW server of the consumer equipment.

In Patent Document 2, addresses of consumer equipments are managed by a service server connected to the Internet, and when the service server receives information identifying consumer equipment and remote operation details from a mobile terminal, the server prepares remote operation instructions based on this information and sends the instructions to the designated consumer equipment.

Patent Document 1: Japanese Published Unexamined Patent Application No. 2001-331394

Patent Document 2: Japanese Published Unexamined Patent Application No. 2003-345686

For a user to access consumer equipments connected to a home network from a user terminal via a wide-area network and perform remote operation of the consumer equipments, the addresses of the consumer equipments must be known to the user. Because the above-described conventional arts are premised on an IP address being allocated in a fixed manner to each user, the address of each piece of consumer equipment is known to the user.

However, in recent years, it has become popular to employ dynamic addressing, with which, upon installing a home gateway inside a home, a global address is allocated to the wide area network (WAN) side interface of this home gateway, private addresses that cannot be accessed from the exterior are allocated to terminals inside the home, and the above-described global address is changed dynamically by an ISP (internet service provider). It was thus difficult for a user to access and operate home equipments from the exterior.

To enable remote operation of home equipments via a network, network configurations, such as allocation of an IP address to each home equipment, etc., must be set. However, a computer is generally necessary for configuring network-ready equipment, and because the configuring task requires advanced technical knowledge, a large burden is placed on the user.

SUMMARY OF THE INVENTION

An object of this invention is provide a consumer equipment remote operation system and a method for putting this system into operation that enables consumer equipments to be configured automatically upon simply connecting the consumer equipments physically to a home network and enables easy remote operation of the consumer equipments via a home gateway that is not necessarily fixed in address.

This invention provides a consumer equipment remote operation system for performing, via a network, remote operation of consumer equipments connected to a home network and includes: a home gateway connecting the home network to a wide-area network; a network configuring means including a home gateway address setting means; and a portal server installed on the wide-area network, and is furthermore characterized in that the following means are taken.

(1) The above-described home gateway furthermore includes: a home management table that manages equipment information on the consumer equipments connected to the home network; an equipment detecting means that cyclically sends a detection request message along the home network to detect consumer equipments and acquires the equipment information of the detected consumer equipments; an equipment information management means that updatingly registers the equipment information on the detected consumer equipments into the above-described home management table; a configuring means that sets network configurations of newly detected consumer equipments; and an equipment information registration means that cyclically performs updating registration of the equipment information in the above-described home management table and address information on the home gateway into the portal server.

(2) The above-described equipment detecting means includes: a UPnP control point that transmits and receives M-SEARCH, defined by UPnP, as the detection request message and as a response message for the detection request; an ICMP transceiver means that transmits ICMP ECHO, and an ICMPv6 transceiver means that transmits ICMPv6 ECHO.

(3) The above-described portal server includes: an online management table that manages equipment information, transmitted from the above-described home gateway according to each user; a user authorizing means that receives an authorization request transmitted from a user via the network; a user-equipment association means that extracts equipment information associated with an authorized user from the above-described online management table; a notation conversion means that converts the extracted equipment information to a notation of high readability; and a means that transmits the notation-converted equipment information to the user.

By the present invention, the following effects are achieved.

(1) Because by simply connecting a network-ready consumer equipment physically to the home network, various registration operations including address setting, are performed automatically and the newest equipment information including address information concerning the respective consumer equipments, are registered in the portal server, a user can acquire the newest equipment information by accessing the portal server.

(2) Because not only M-SEARCH, but ICMP ECHO and ICMPv6 ECHO are used as detection request messages to be transmitted to the home network, even UPnP-disabled consumer equipments can be detected automatically and configured automatically upon simply being connected to the home network.

(3) Because equipment information registered in the portal server are transmitted to respective user terminals upon being improved in readability, the ability of users to read the equipment information is improved.

BRIEF DESCRIPTION OF THE DRAWINGS

FIG. 7 is a schematic diagram of an example of a home management table for UPnP-enabled equipments.

FIG. 10 is a schematic diagram of an example of a home management table for UPnP-disabled IPv4 equipments.

FIG. 13 is a schematic diagram of an example of a home management table for UPnP-disabled IPv6 equipments.

DETAILED DESCRIPTION OF THE PREFERRED EMBODIMENT

Figure 1:
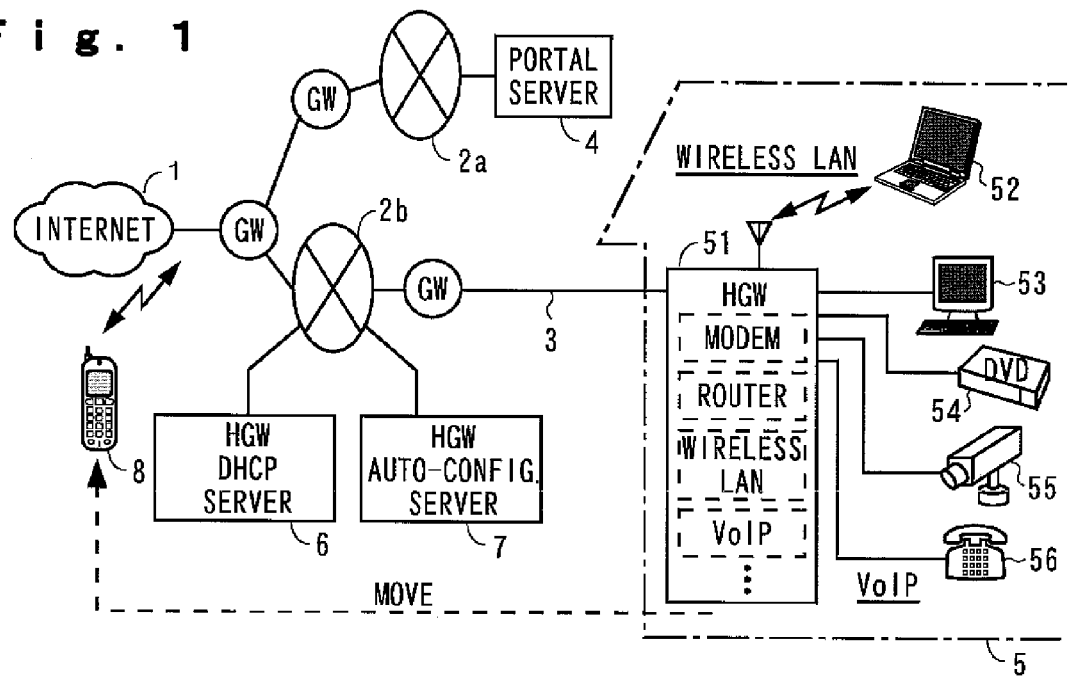
FIG. 1 is a block diagram of a consumer equipment remote operation system to which this invention is applied.

Best modes for carrying out this invention shall now be described in detail. FIG. 1 is a block diagram of a consumer equipment remote operation system to which this invention is applied, and here, wide-area networks 2a and 2b of an ISP (Internet Service Provider) are connected to internet 1 via gateways (GW), and between a wide-area network 2b and a home gateway (HGW) 51, installed inside a user home 5, a constant internet connection service, using an xDSL (x Digital Subscriber Line) 3, is established. A portal server 4, to be described in detail later, is included in the wide-area network 2a. An HGW DHCP server 6 and an HGW automatic configuration server 7 are included in the wide-area network 2b.

A home network inside the user home 5 is connected via the HGW 51 to the wide-area network 2b. The HGW 51 is equipped with an xDSL modem function, a router function, a wireless LAN function, a VoIP function, etc. A mobile information terminal 52, functioning as a wireless LAN terminal, a personal computer 53, a DVD recorder 54, a network camera 55, a fixed-line phone 56, etc., are included in the home network. The DVD recorder 54 and network camera 55 are network-ready consumer equipments equipped with interfaces, such as LAN ports.

The portal server 4 on the wide-area network 2a contains user identification information, information indicating association of the respective consumer equipments (54, 55), housed inside home 5 of the user, and the user, and information for remote operation of the respective consumer equipments by the user via the network. When the user is to perform remote operation of consumer equipment from an outside location, the user accesses the portal server 4 from the user's own mobile phone 8, PDA, or other information terminal and acquires equipment information on the respective consumer equipment upon undergoing predetermined authorization procedures. The user can then access the desired consumer equipments from the mobile phone 8 and perform remote operation of the consumer equipments by setting predetermined items on a screen.

Figure 2:
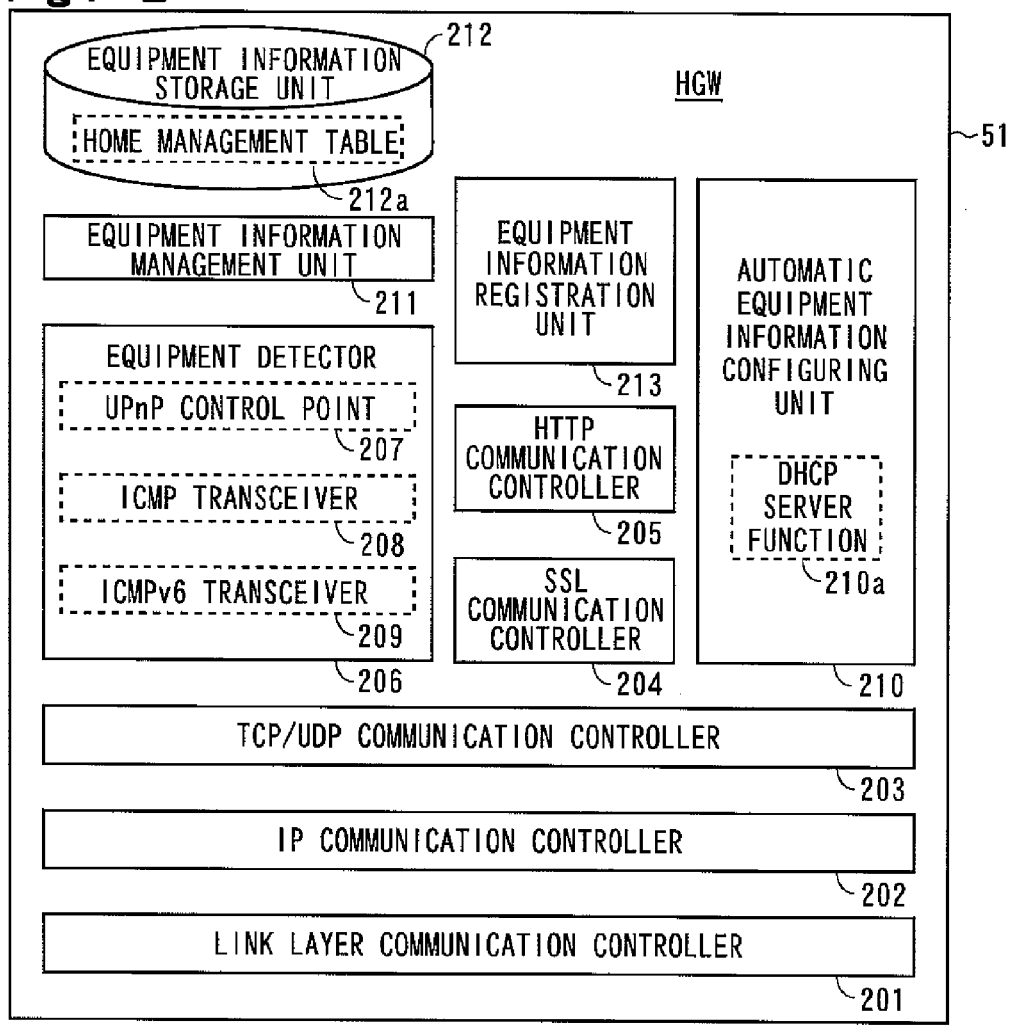
FIG. 2 is a block diagram of an HGW (51).

FIG. 2 is a block diagram of an arrangement of principal portions of the HGW 51. A link layer communication controller 201 controls communication by the IEEE 802.3 (Ethernet) and IEEE 802.11 (wireless LAN). An IP communication controller 202 controls communication by IP. A TCP/UDP communication controller 203 controls communication according to TCP and UDP. An SSL communication controller 204 controls communication by SSL (Secure Socket Layer). An HTTP communication controller 205 controls communication by HTTP.

An equipment detector 206 uses a UPnP control point 207, an ICMP transceiver 208, and an ICMPv6 transceiver 209 to automatically detect consumer equipments connected to the home network. In this process, UPnP-enabled consumer equipments are automatically detected at the UPnP control point 207, IPv4 consumer equipments that are not UPnP-enabled are automatically detected at the ICMP transceiver 208, and IPv6 consumer equipments that are not UPnP-enabled are automatically detected at the ICMPv6 transceiver 209. Equipment information on the automatically detected consumer equipments are registered and stored in a non-volatile manner in a home management table 212a in an equipment information storage unit 212 by an equipment information management unit 211.

Furthermore, after detecting the equipments, the above-described equipment detector 206 performs constant monitoring (aging) of the detected equipments until the corresponding equipments are disconnected or the power thereof is turned off. If during this aging, there is an equipment that does not respond for a preset number of times successively, that equipment is judged to be disconnected or is in the power-off state and the corresponding entry is deleted from the home management table 212a.

An automatic equipment information configuring unit 210 has a DHCP server function 210a and, when a consumer equipment that is newly connected to the home network is detected by the equipment detector 206, performs automatic configuration (network configuration) of an IP address, IP net mask, a default gateway IP address, and a DNS (Domain Name System) server IP address of the automatically detected consumer equipment. An equipment information registration unit 213 cyclically registers the equipment information, recorded in the home management table 212a, into the portal server 4 at a cycle that differs from the cycle of the above-described automatic detection.

Figure 3:
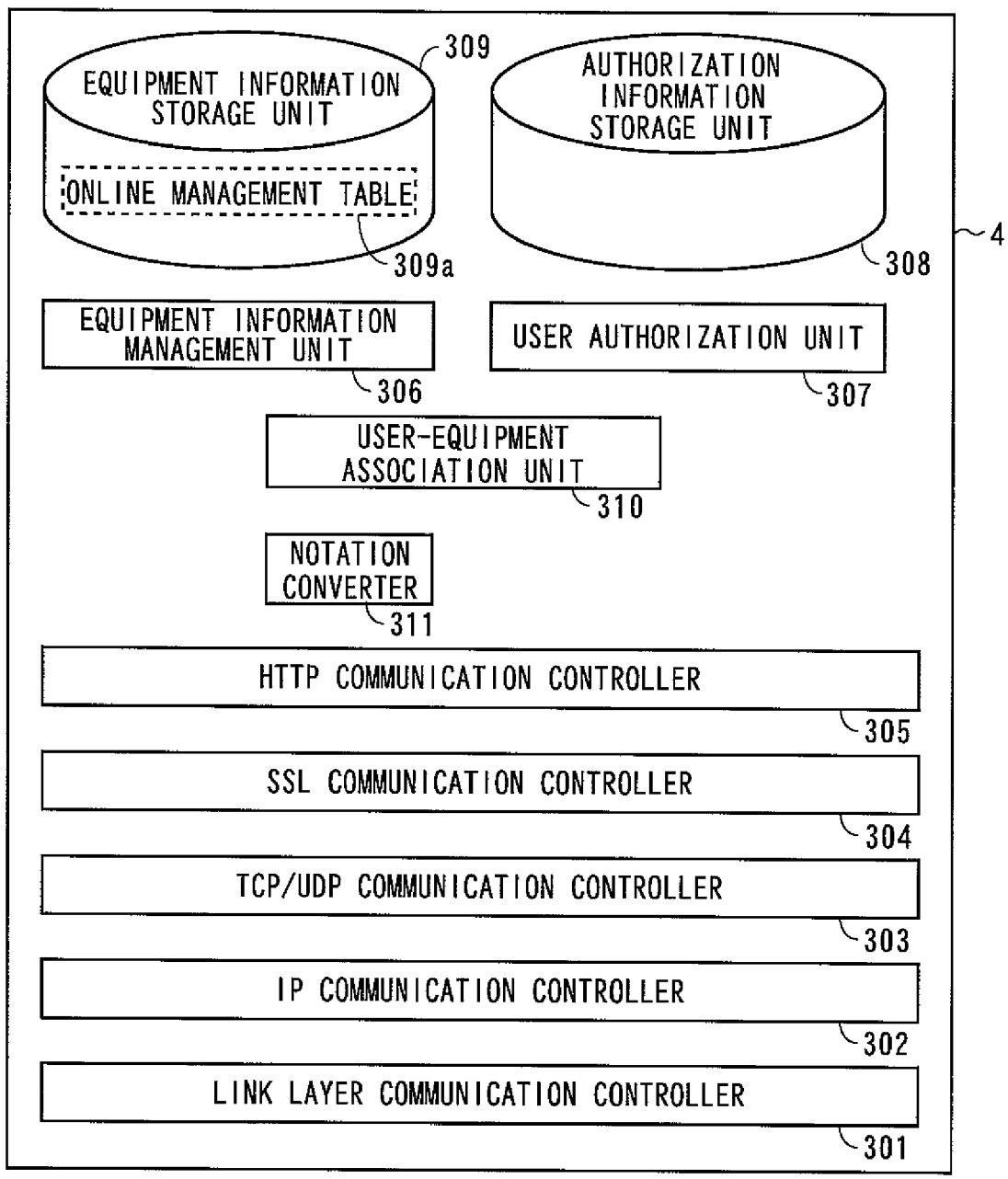
FIG. 3 is a block diagram of a portal server (4).

FIG. 3 is a block diagram of the portal server 4. A link layer communication controller 301 controls communication by the IEEE 802.3 and IEEE 802.11. An IP communication controller 302 controls communication by IP. A TCP/UDP communication controller 303 controls communication according to TCP and UDP. An SSL communication controller 304 controls communication by SSL. An HTTP communication controller 305 controls communication by HTTP.

Upon receiving an equipment information registration request from the equipment information registration unit 213 of the HGW 51, an equipment information management unit 306 updatingly registers the equipment information into an online management table 309a of an equipment information storage unit 309. Upon receiving an authorization request, containing a user account and password pair, a user authorization unit 307 authenticates and specifies a user based on whether or not this pair is already registered in an authorization information storage unit 308. A user-equipment association unit 310 provides associations of an authorized user and equipment information on an operating screen of the mobile phone 8 (FIG. 1). In providing equipment information to the user, a notation converter 311 converts the notation of the information to a notation of high readability to improve the readability on the operating screen of the mobile phone 8.

When a user turns on the power of the HGW 51 (FIG. 1) for the first time upon installation in the home network and inputs a user account and a password provided from the ISP in advance, the HGW 51 begins communication with the HGW automatic configuration server 7 (FIG. 1) and the HGW DHCP server 6 (FIG. 1) according to an automatic configuration program registered in advance, and when the above-described account and password are authorized correctly, network configuration is performed automatically.

If the above-described automatic configuration program is not registered in the HGW 51 or if the program is registered but is of an old version that needs to be updated, the newest automatic configuration program is automatically downloaded from the HGW automatic configuration server 7 into the HGW 51. The above-described automatic configuration by the automatic configuration program and the updating, etc., thereof are described in detail in a patent application (Japanese Patent Application No. 2004-157527) by the present Applicant.

Figure 4:
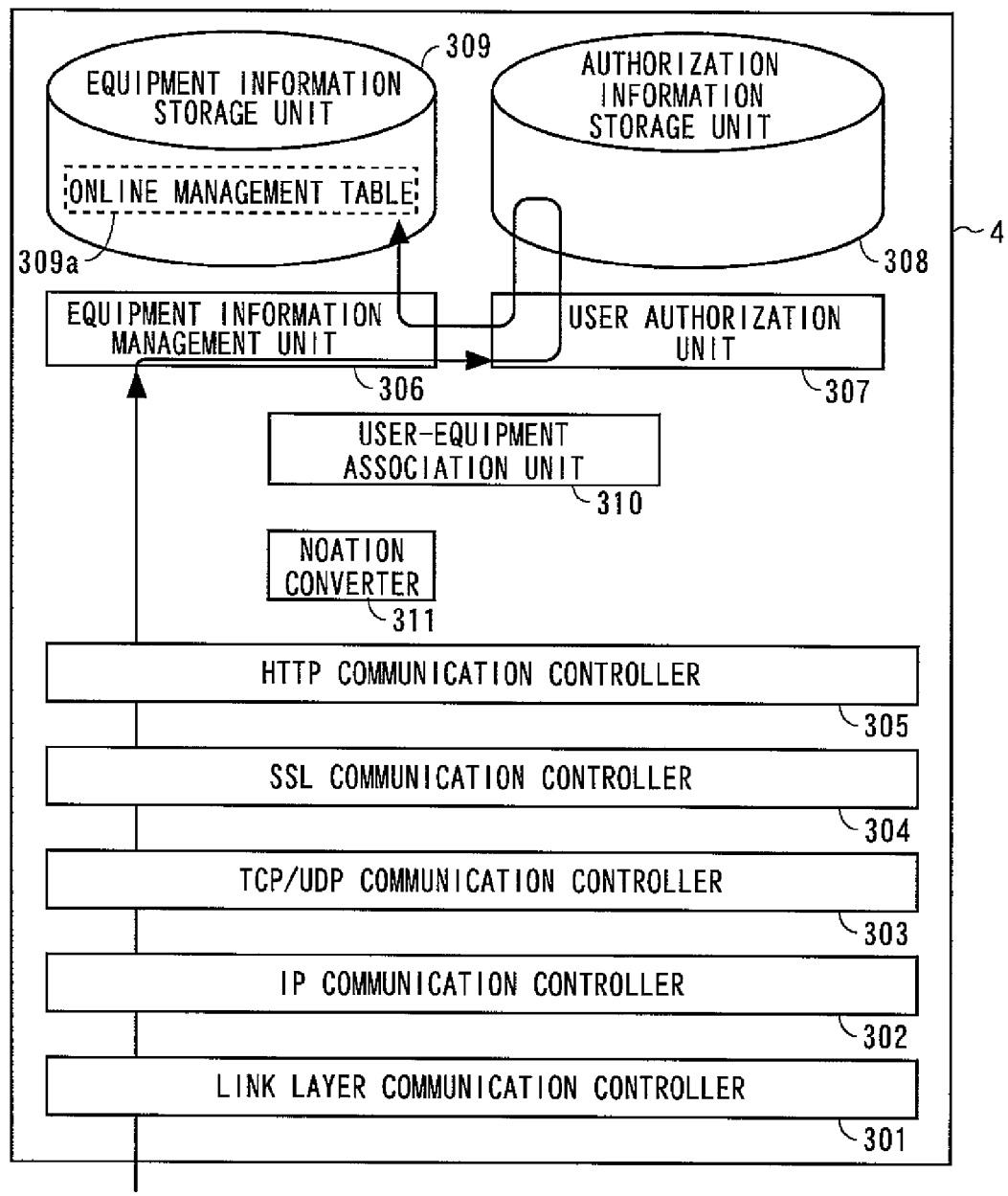
FIG. 4 is a block diagram of the portal server for describing an equipment information registration/updating procedure.

FIG. 4, which is a block diagram of the portal server 4, shall now be referred to describe equipment information registration/updating procedure.

Upon receiving an equipment information registration request from the HGW 51, equipment information management unit 306 provides the user account and password contained in this registration request to the user authorization unit 307 and requests for user authorization and identification. The user authorization unit 307 authenticates and identifies the user based on whether or not the provided user account and password pair has been already registered in the authorization information storage unit 308. Furthermore, upon being notified of the user authorization and identification results from the user authorization unit 307, equipment information management unit 306 newly registers or updatingly registers equipment information, received from the HGW 51, into the online management table 309a according to each user.

Figure 5:
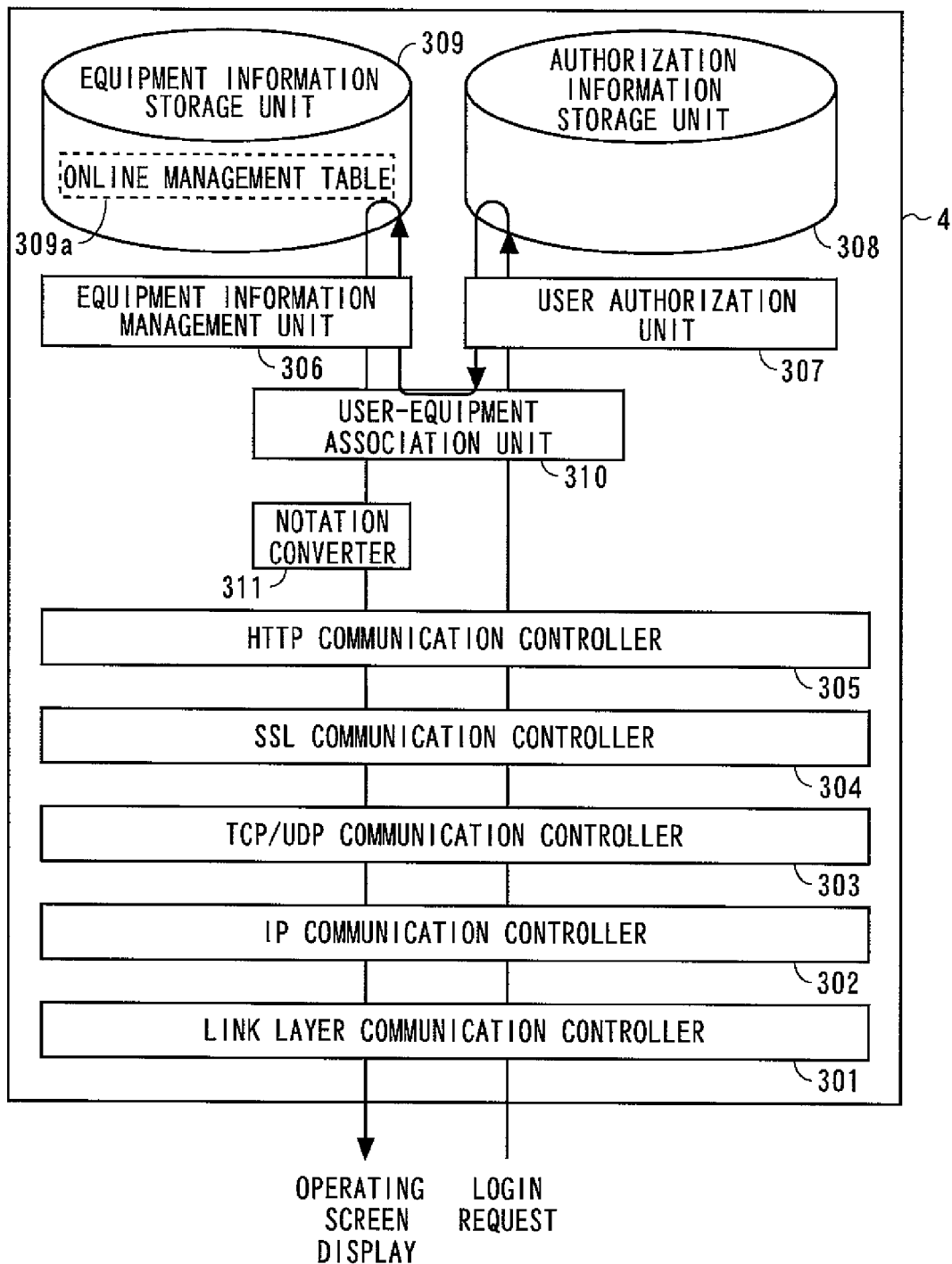
FIG. 5 is a block diagram of the portal server for describing procedures from login to display of an operating screen in performing remote operation from a mobile terminal.

FIG. 5, which is a block diagram of the portal server 4, shall now be referred to describe procedures from login request to display of an operating screen in performing remote operation of consumer equipment from the mobile phone 8 after completion of the above-described registration of equipment information.

A user who is to perform remote operation of a piece of consumer equipment on the home network from an outside location logs into the portal server 4 using the mobile phone 8 (FIG. 1). In performing login, the user inputs the same user account and password as that used when the HGW 51 was installed initially. The user-equipment association unit 310 receives this login request. The user-equipment association unit 310 provides the user account and password, given as inputs in the login process, to the user authorization unit 307 and requests for user authorization and identification. The user authorization unit 307 authenticates and identifies the user based on whether or not the provided user account and password pair has been already registered in the authorization information storage unit 308. Upon receiving the user authorization and identification results from the user authorization unit 307, user-equipment association unit 310 reads equipment information associated with the user from the online management table 309a and transmits the information to the notation converter 311. The notation converter 311 edits the IP address, domain name, etc., and other equipment information to improve the readability (translation from English into Japanese) of the information and then transmits the information to the mobile terminal 8.

Figure 6:
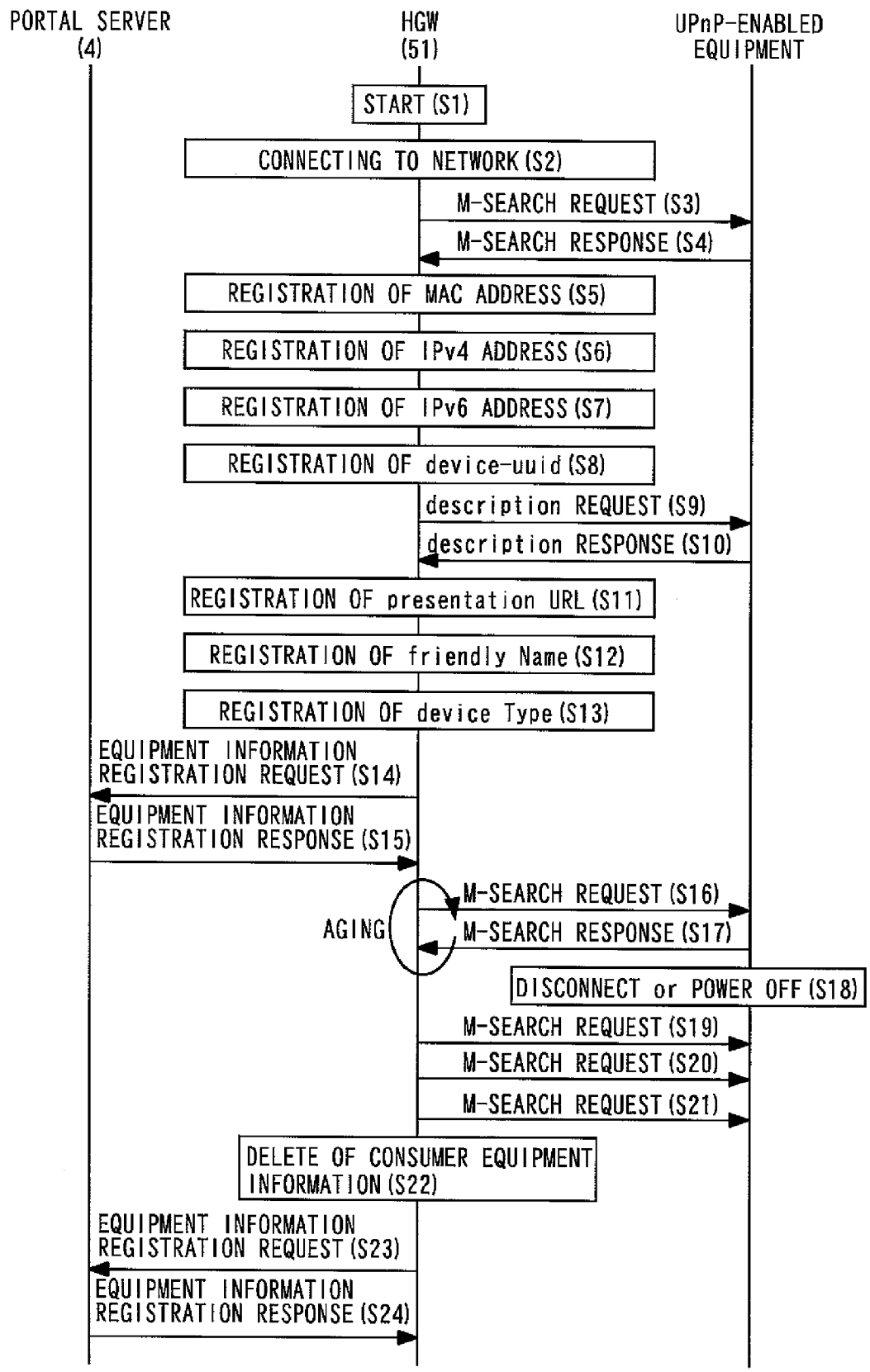
FIG. 6 is a sequence diagram of procedures from detection of a UPnP-enabled consumer equipment to registration of equipment information and deletion of the equipment information.

FIG. 6, which is a sequence diagram, shall now be referred to describe procedures from detection of a UPnP-enabled consumer equipment to registration of equipment information and deletion of the equipment information.

After the HGW 51 is started up in step S1, the IP address, IP net mask, default gateway IP address, and DNS serer IP address are automatically set in step S2 for all pieces of consumer equipments, connected to the home network, by the DHCP server function 210a equipped in automatic equipment information configuring unit 210 of the HGW 51. That is, network configurations are set for the respective pieces of consumer equipment automatically. In step S3, an M-SEARCH request, defined by UPnP, is broadcast transmitted cyclically along the home network from the UPnP control point 207. In step S4, if a UPnP-enabled consumer equipment is connected to the home network, an M-SEARCH response is transmitted back from the consumer equipment to the HGW 51 and this is received by the UPnP control point 207.

In steps S5 to S8, a MAC address, an IPv4 address, an IPv6 address, and a device-uuid are acquired from the received M-SEARCH response and are registered in a non-volatile manner as equipment information in the home management table 212a of the equipment information storage unit 212.

In step S9, a description request, defined by UPnP, is transmitted to the consumer equipment in order to recognize details concerning the type, functions, abilities, and available services of the consumer equipment. After a response is transmitted back in step S10, a presentation URL, a friendly Name, and a device Type are acquired from the response message in steps S11 to S13, respectively, and registered in the home management table 212a.

Depending on the consumer equipment, one of either the IPv4 address or the IPv6 address may not be contained in the response or the presentation URL may not be contained, and in these cases, the corresponding column of the home management table 212a is empty.

FIG. 7 is a schematic diagram of an example of the home management table 212a for UPnP-enabled equipment, and the equipment information of the above described automatically detected are managed in association with the respective equipment identified by MAC address.

Returning now to FIG. 6, in step S14, the equipment information registration unit 213 of the HGW 51 transmits an equipment information registration request of requesting the portal server 4 for the equipment information registered in the home management table 212a as shown in FIG. 7 and for the configuration information of the HGW 51. At the portal server 4, the equipment information and the configuration information of the HGW 51 received from the HGW 51 are updatingly registered in the online management table 309a by the equipment information management unit 306. In step S15, an equipment information registration response is transmitted back from the portal server 4 that indicates completion of the above-described updating registration. This registration request and response for the request are repeated at a predetermined cycle that has been set in advance.

Figure 8:
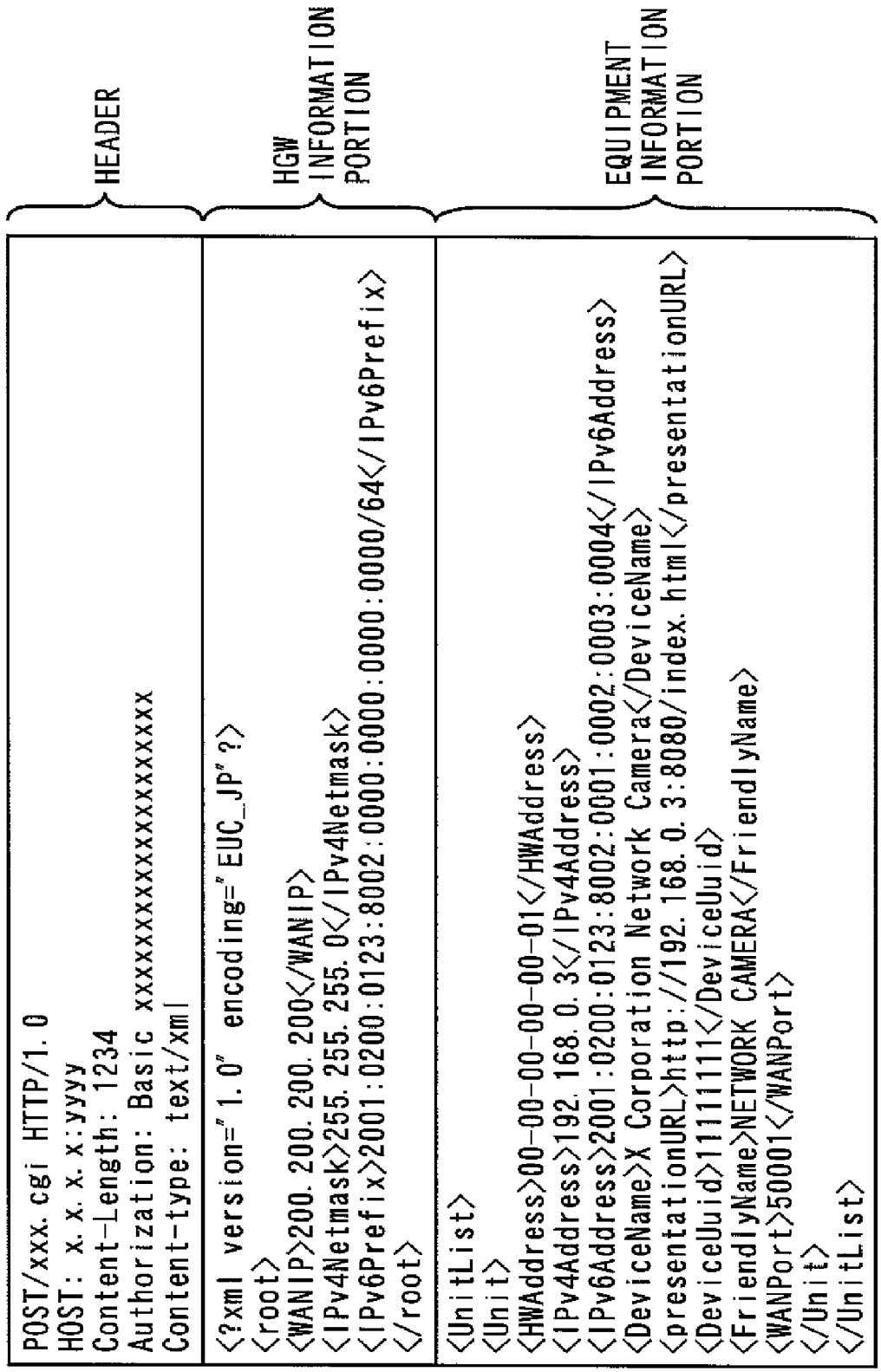
FIG. 8 is a diagram of an example of a message format in a case where HTTP is used for making a request for registration of the home management table for UPnP-enabled equipments into the portal server.

FIG. 8 is a diagram of an example of a message format in a case where HTTP is used for making a registration request to the portal server 4 and here, a description shall be provided with equipment information of the network camera 55 in FIG. 1 as an example.

At an authorization portion of a header portion, the encoded user account and password are designated. At the HGW information portion, a WAN side IPv4 address of the HGW 51, a LAN side IP net mask, and a IPv6 prefix of the HGW 51 are designated as information unique to the HGW 51 in a WAN IP portion, IPv4 Net mask portion, and an IPv6 Prefix portion, respectively.

An equipment information portion, beginning with the <UnitList> tag and ending with the <\UnitList> tag, may contain not just UPnP-enabled equipment information but may contain a plurality of information, including information on UPnP-disabled IPv4 equipment and UPnP-disabled IPv6 equipment, at the same time. FIG. 8 shows an example in which equipment information of a single piece of UPnP-enabled equipment is registered. The <HW Address> tag designates the MAC address value. The <IPv4 Address> tag designates the IPv4 address value. The <IPv6 Address> tag designates the IPv6 address value. The <Device Name> tag designates the device Type value. The <presentation URL> tag designates the presentation URL value. The <Device Uuid> tag designates the device-uuid value. The <Friendly Name> tag designates the friendly Name of the consumer equipment. If port mapping, which is known as an arrangement for external operation, is to be used, the <WAN Port> tag designates the port number value used for mapping. With the example of FIG. 8, by designating "http://x.x.x.x:yyyy-_-/http://200.200.200.200:50001" as the URL, the consumer equipment can be remotely operated from a mobile phone 8 in FIG. 1 or an IPv4 PC outside the home.

"x.x.x.x:yyyy" is the address of the portal server 4, the character string "-_-" is a code indicating a redirect of the operation request, addressed to the portal server, to the HGW 51, "200.200.200.200" is the WAN side IPv4 address of the HGW 51, and "50001" is the port number that the HGW associates with the presentation URL of the home equipment.

Returning now to FIG. 6, in step S16, the above-described M-SEARCH request is broadcast-transmitted again along the home network and the aging process of constantly monitoring the connection states and power ON/OFF states of the consumer equipments is executed. Specifically, each time the M-SEARCH request is transmitted in step S16, the values of aging counters in the home management table 212a are incremented. If when an M-SEARCH response is received in step S17, the same MAC address as the MAC address contained in the response has been already registered in the home management table 212a, the aging counter of the corresponding entry is cleared to "0". If the MAC address is unregistered, the above-described procedure of steps S4 to S13 is executed to newly register equipment information into the home management table 212a.

Thereafter, when a detected consumer equipment is put in a disconnected state or a power OFF state in step S18, because a response will not be transmitted back for any of the M-SEARCH requests transmitted in the subsequent steps S19 to S21, the aging counter of the corresponding consumer equipment continues to be incremented at the home management table 212a. When the value of the aging counter exceeds a predetermined threshold value, the entry of the corresponding consumer equipment is deleted from the home management table 212a at step S22. Because the updated contents of the home management table 212a are updatingly registered into the portal server 4 in the next registration request cycle (steps S23 and S24), the updated contents of the HGW 51 are rapidly reflected in the portal server 4.

Figure 9:
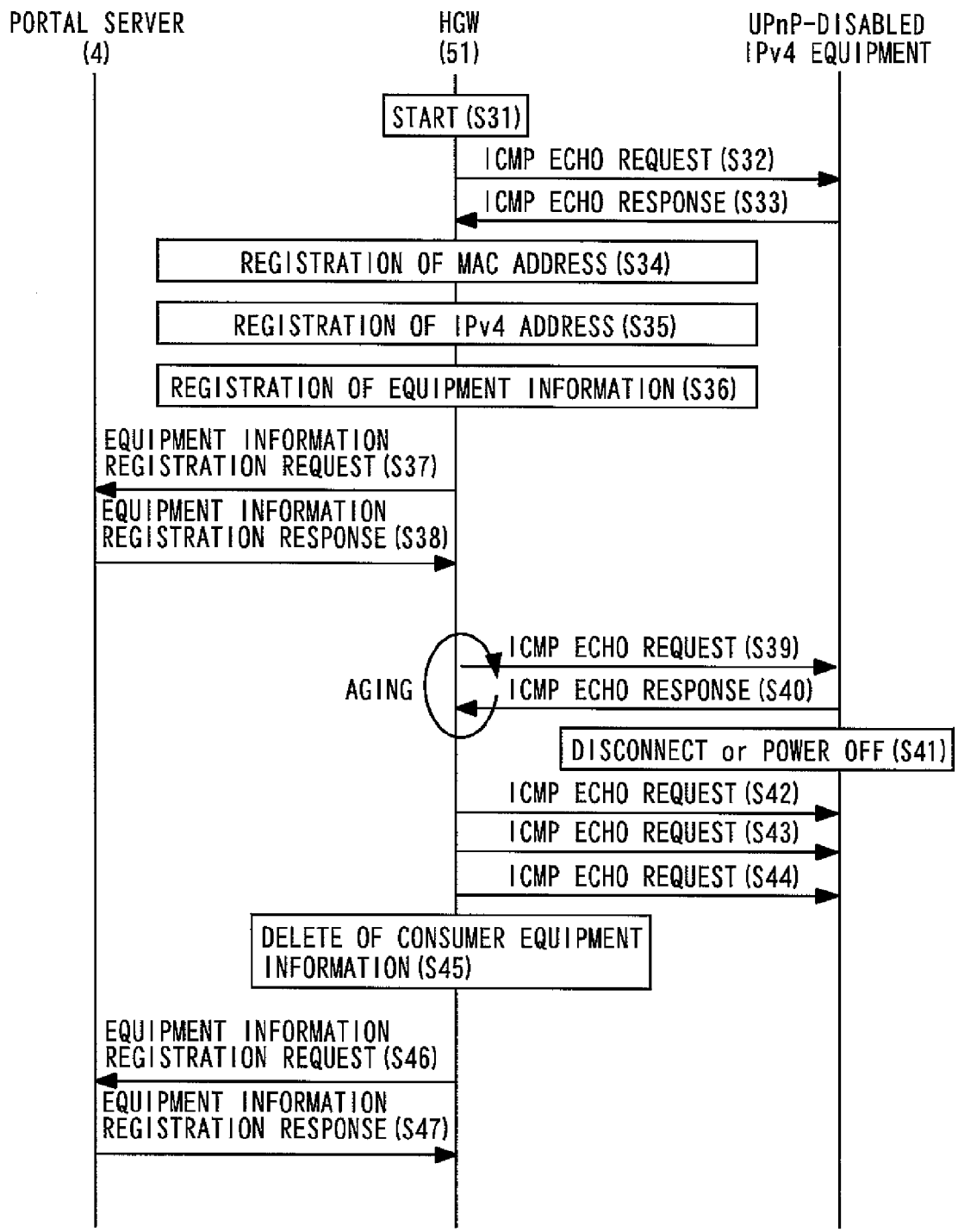
FIG. 9 is a sequence diagram of procedures from detection of UPnP-disabled consumer equipment to registration of equipment information and deletion of the equipment information.

As a second embodiment of this invention, procedures from detection of a UPnP-disabled consumer equipment to registration of equipment information and deletion of the equipment information shall be described with a reference to the sequence diagram of FIG. 9.

After the HGW 51 is started up in step S31 and after network configuration of the UPnP-disabled IPv4 equipment by DHCP is performed, an ICMP (Internet Control Message Protocol) ECHO request is transmitted cyclically from the ICMP transceiver 208 to a preset IPv4 address range set in step S32. The address range is set, for example, by designating a search head address, such as "192.168.0.2," and a search range, such as "6," and in this case, the ICMP ECHO request is transmitted successively to the respective addresses of six units from "192.168.0.2" to "192.168.0.7." If a piece of IPv4-enabled consumer equipment is connected to the home network, an ICMP ECHO response is transmitted back from the consumer equipment and this is received by the ICMP transceiver 208 in step S33. In steps S34 and S35, equipment information, including a MAC address and an IPv4 address, are acquired from the received response message. In step S36, the acquired equipment information is registered into the home management table 212a.

FIG. 10 is a schematic diagram of an example of registered contents of the home management table 212a, and here, the MAC addresses and IPv4 addresses of the respective pieces of consumer equipment are managed along with their status and aging counters.

Returning now to FIG. 9, in step S37, the equipment information registration unit 213 of the HGW 51 transmits an equipment information registration request of requesting the portal server 4 for the equipment information registered in the home management table 212*a* as shown in FIG. 10 and for the configuration information of the HGW 51. At the portal server 4, the equipment information and the configuration information of the HGW 51 received from the HGW 51 are registered and updated in the online management table 309*a* by the equipment information management unit 306. In step S38, an equipment information registration response is transmitted back from the portal server 4 that indicates completion of the above-described updating registration. These registration request and response for the request are repeated at a predetermined cycle that has been set in advance.

Figure 11:
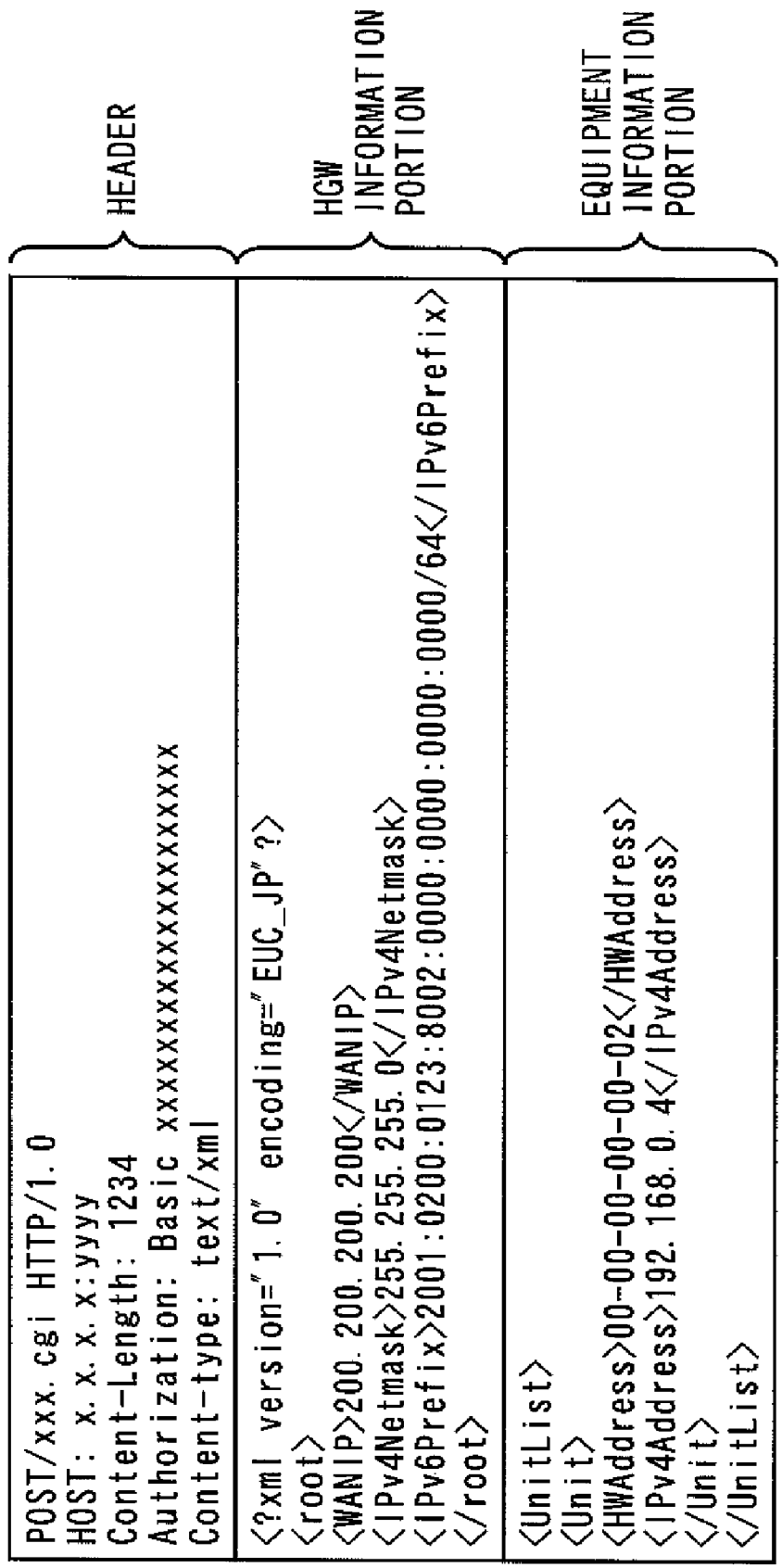
FIG. 11 is a diagram of an example of a message format in a case where HTTP is used for making a request for registering the home management table for UPnP-disabled IPv4 equipments into the portal server.

FIG. 11 is a diagram of an example of a message format in a case where HTTP is used for making a request for registration into the portal server 4.

At an authorization portion of a header portion, the encoded user account and password are designated. At the HGW information portion, a WAN side IPv4 address of the HGW 51, a LAN side IP net mask, and a IPv6 prefix of the HGW 51 are designated as information unique to the HGW 51 in a WAN IP portion, IPv4 Net mask portion, and an IPv6 Prefix portion, respectively.

An equipment information portion, beginning with the <UnitList> tag and ending with the </UnitList> tag, may contain not just UPnP-enabled equipment information but may contain a plurality of information, including information on UPnP-disabled IPv4 equipment and UPnP-disabled IPv6 equipment, at the same time. FIG. 11 shows an example in which equipment information of a single piece of UPnP-disabled IPv4 equipment is registered. The <HW Address> tag designates the MAC address value. The <IPv4 Address> tag designates the IPv4 address value.

Returning now to FIG. 9, in step S39, the above-described ICMP ECHO request is transmitted again, and the aging process of constantly monitoring the connection states and power ON/OFF states of the consumer equipments is executed. Specifically each time ICMP ECHO request is transmitted in step S39, the values of aging counters of consumer equipment, for which the "status" is "valid" in the home management table 212*a*, are incremented. If when an ICMP ECHO response is received in step S40, the "status" of the consumer equipment with the same MAC address as the MAC address contained in the response is "valid," the aging counter of that equipment is cleared to "0," and if the "status" is "invalid," the status is changed to "valid" and the aging counter of that equipment is set to "0."

Thereafter, when a detected consumer equipment is put in a disconnected state or a power OFF state in step S41, because a response will not be transmitted back for any of the ICMP ECHO requests transmitted in the subsequent steps S42 to S44, the aging counter of the corresponding equipment continues to be incremented at the home management table 212*a*. When the value of the aging counter exceeds a predetermined threshold value, the "status" of the corresponding consumer equipment is changed from "valid" to "invalid" at step S45 and the value of the aging counter becomes undefined.

Because the contents of the home management table 212*a* after updating are updatingly registered into the portal server 4 in the next registration request cycle (steps S46 and S47), the updated contents of the HGW 51 are rapidly reflected in the portal server 4.

Thus according to this embodiment, by simply connecting network-ready consumer equipment physically to the home network, various registration operations, including address setting, can be performed automatically.

Also, though, in many cases, a global address that is allocated by the ISP to each user is changed each time the HGW 51 is started up, in the present embodiment, network configurations are made automatically each time the HGW 51 is started up and the global address allocated to the HGW 51 is registered, along with the equipment information of the respective consumer equipment, into the portal server 4. A user attempting to perform remote operation of consumer equipment can thus acquire the newest information concerning the global address of the HGW 51 and the addresses and status of the respective pieces of consumer equipment upon accessing the portal server 4 and being authorized. Thus by accessing the consumer equipment using the acquired information, the desired consumer equipment can be remote operated simply and reliably.

Figure 12:
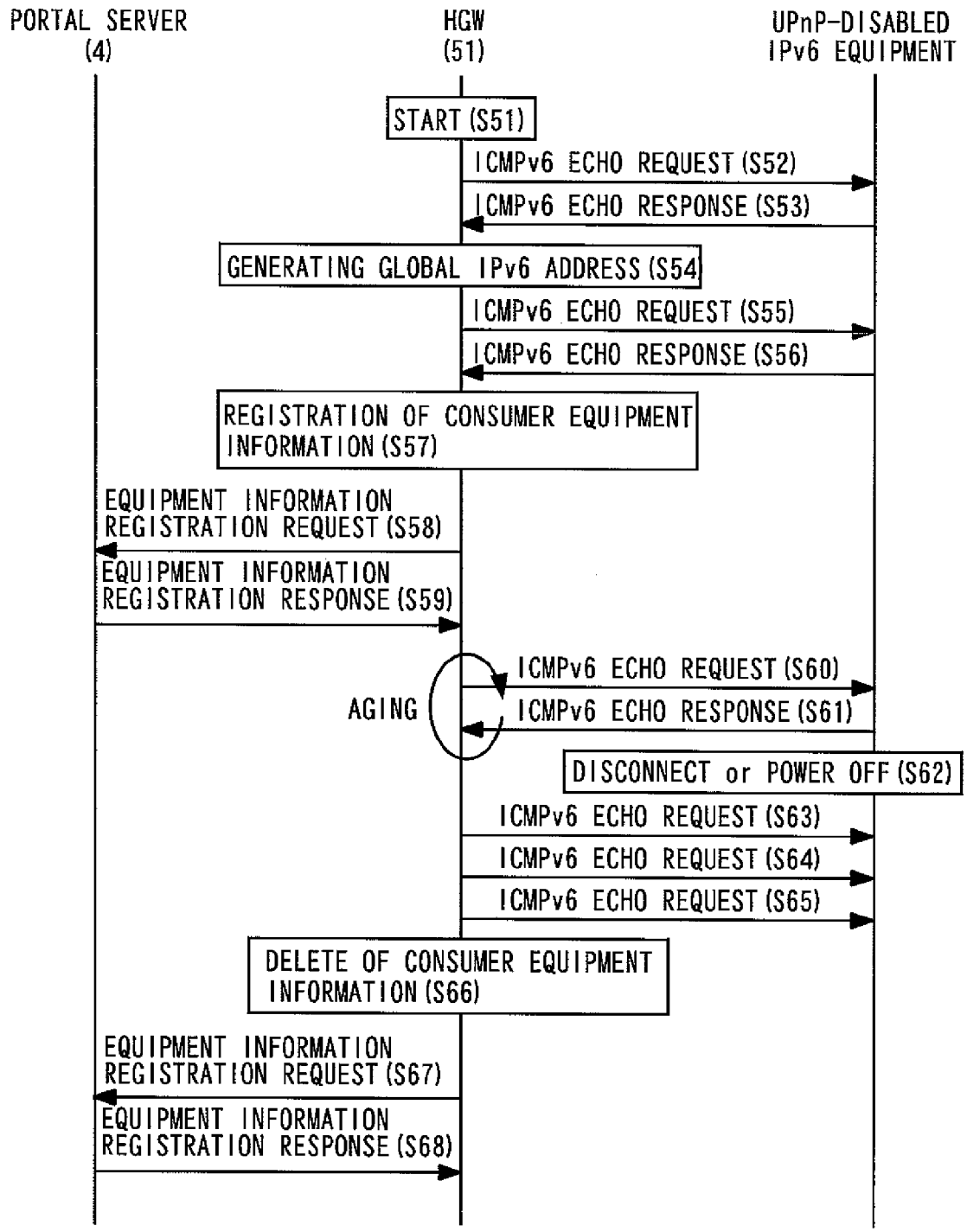
FIG. 12 is a sequence diagram of procedures from detection of a UPnP-disabled IPv4 equipment to registration of equipment information and deletion of the equipment information.

As a third embodiment of this invention, procedures from detection of a UPnP-disabled IPv6 consumer equipment to registration of equipment information and deletion of the equipment information shall be described with reference to the sequence diagram of FIG. 12.

After the HGW 51 is started up in step S51, an ICMPv6 ECHO request is broadcast-transmitted (with the destination address being FF02::1) cyclically from the ICMPv6 transceiver 209 in step S52. If an IPv6-enabled consumer equipment is connected to the home network, an ICMPv6 ECHO response is transmitted back from the consumer equipment in step S53. This response message is received by the ICMPv6 transceiver 209 and a link local IPv6 address is acquired. In step S54, an interface ID is extracted from the acquired link local IPv6 address and is joined with the IPv6 Prefix provided to the HGW 51 to generate a global IPv6 address of the responding IPv6 equipment.

For example, if the IPv6 Prefix provided to the HGW 51 is 3FFE:0000:0000:CD30:0000:0000:0000:0001/64, and for the ICMPv6 ECHO request sent to FF02::1, a response is provided from a consumer equipment, the link local IPv6 address of which is FE80:0000:0000:0000:0211:22FF:FE33:4455, the global address becomes: 3FFE:0000:0000:CD30:0211:22FF:FE33:4455.

In step S55, the ICMPv6 ECHO request is transmitted again to the above-described global IPv6 address that is generated. When a response message for this request is received in step S56, the MAC address is extracted from the response message. In step S57, this MAC address, link local IPv6 address, and global IPv6 address are registered along with the "status" and the aging counter in the home management table 212*a* as shown for example in FIG. 13.

Returning now to FIG. 12, in step S58, the equipment information registration unit 213 of the HGW 51 transmits an equipment information registration request of requesting the portal server 4 for the equipment information registered in the home management table 212*a* as shown in FIG. 13 and for the configuration information of the HGW 51. At the portal server 4, the equipment information and the configuration information of the HGW 51 received from the HOW 51 are registered and updated in the online management table 309*a* by the equipment information management unit 306. In step S59, an equipment information registration response is transmitted back from the portal server 4 that indicates completion of the above-described updating registration. These registration request and response for the request are repeated at a predetermined cycle that has been set in advance.

Figure 14:
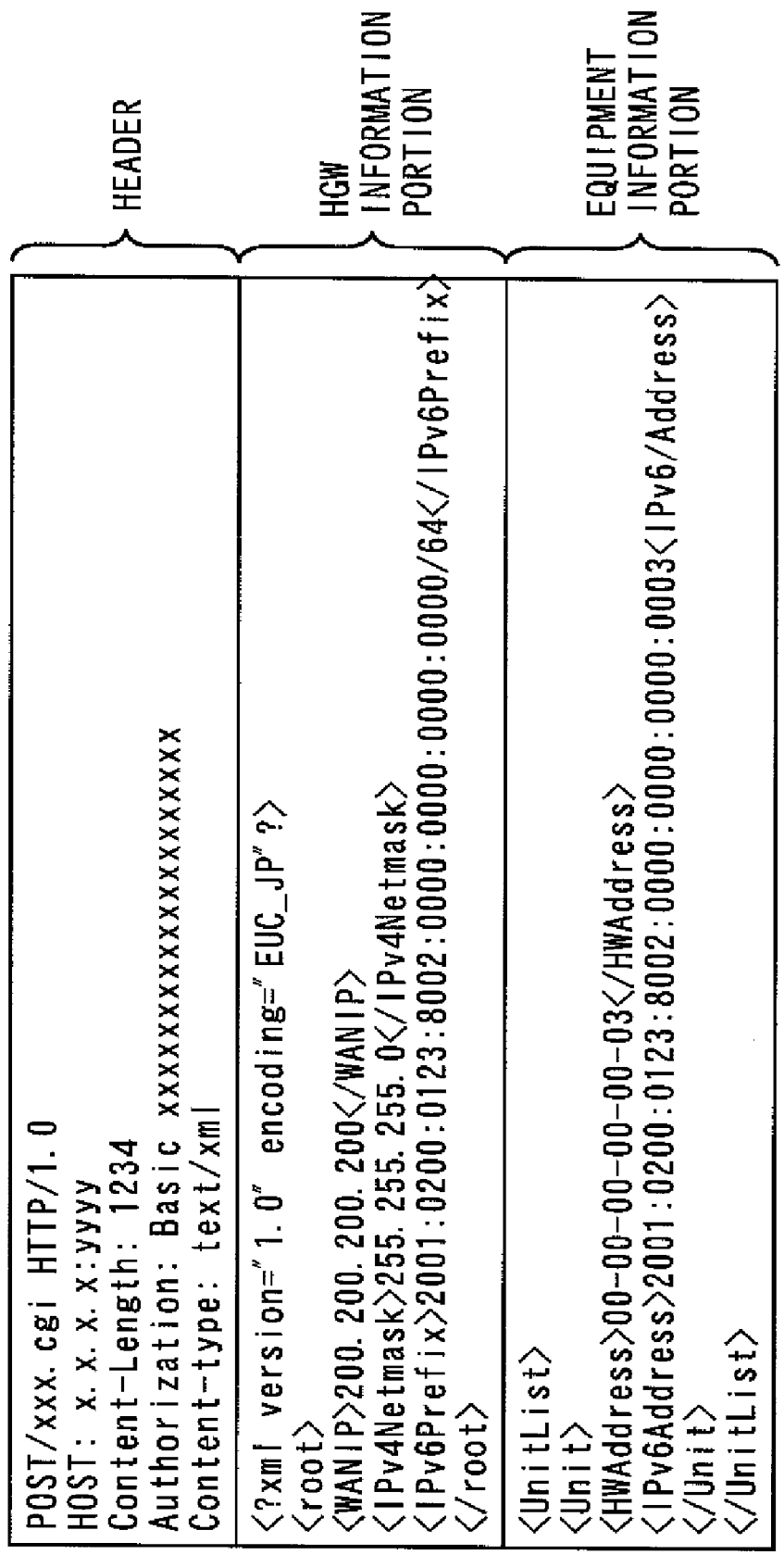
FIG. 14 is a diagram of an example of a message format in a case where HTTP is used for making a request for registering equipment information of UPnP-disabled IPv6 equipments into the portal server.

FIG. 14 is a diagram of an example of a message format in a case where HTTP is used for making a request for registration into the portal server 4.

At an authorization portion of a header portion, the encoded user account and password are designated. At the HGW information portion, a WAN side IPv4 address of the HGW 51, a LAN side IP net mask, and an IPv6 prefix of the HGW 51 are designated as information unique to the HGW 51 in a WAN IP portion, IPv4 Net mask portion, and an IPv6 Prefix portion, respectively.

An equipment information portion, beginning with the <UnitList> tag and ending with the </UnitList> tag, may contain not just UPnP-enabled equipment information but may contain a plurality of information, including information on UPnP-disabled IPv4 equipment and UPnP-disabled IPv6 equipment, at the same time. FIG. 14 shows an example in which equipment information of a single piece of UPnP-disabled IPv6 equipment is registered. The <HW Address> tag designates the MAC address value. The <IPv6 Address> tag designates the global IPv6 address value. Returning now to FIG. 12, in steps S60 and S61, the processes of the above-described steps S55 and S56 are repeated and the aging process of constantly monitoring the connection states and power ON/OFF states of the consumer equipments is executed. Specifically, each time the ICMPv6 ECHO request is transmitted to the global IPv6 addresses in step S60, the values of the aging counters are incremented. When the ICMPv6 ECHO response is received from a piece of equipment that has been detected already, the value of the aging counter of that equipment is set to "0" and the status is changed to "valid" as has been described above.

Thereafter, when a detected consumer equipment is put in a disconnected state or a power OFF state in step S62, because a response will not be transmitted back for any of the ICMPv6 ECHO requests sent to global IPv6 address in the subsequent steps S63 to S65, the aging counter of the corresponding equipment continues to be incremented at the home management table 212a. When the value of the aging counter exceeds a predetermined threshold value, the "status" of the corresponding consumer equipment is changed from "valid" to "invalid" at step S66 and the value of the aging counter becomes undefined.

Because the contents of the home management table 212a are registered and updated into the portal server 4 in the next registration request cycle (steps S67 and S68), the updated contents of the HGW 51 are rapidly reflected in the portal server 4.

With the above-described second and third embodiments, because ICMP ECHO or ICMPv6 ECHO is used in place of M-SEARCH as the detection request message transmitted to the home network, even UPnP-disabled consumer equipments can be detected automatically upon simply being connected to the home network and the configurations are made automatically as well.

Although with the above-described first to third embodiments, procedures up to registration into the portal server 4 of just one consumer equipment was described as an example, this invention is not restricted thereto, and a plurality pieces of consumer equipment that differ in attributes concerning UPnP (enabled or disabled) and IP protocol (IPv4 or IPv6) can be registered in a batch as well.

Figure 15:
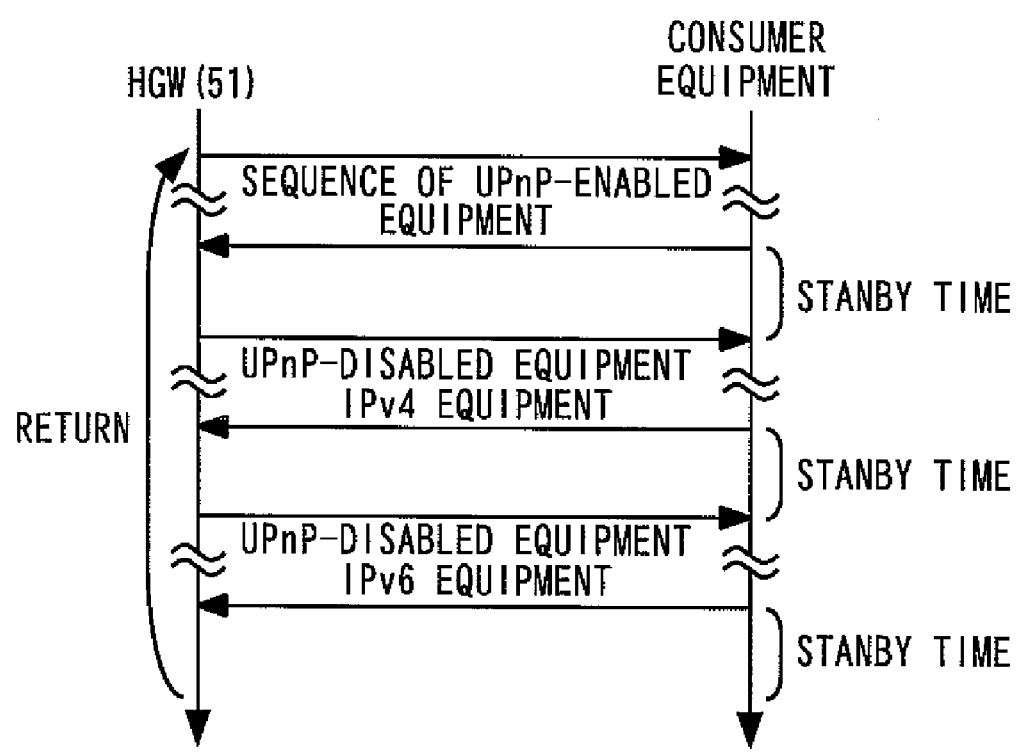
FIG. 15 is a sequence diagram of a procedure of registering a plurality of consumer equipments of different attributes in a batch.

FIG. 15 is a sequence diagram of a procedure of registering a plurality of consumer equipments that differ in attributes in a batch, and this procedure is arranged so that the procedures of the respective embodiments described above are repeated in series with standby periods of a few seconds each being interposed. The equipment information registration request is transmitted cyclically from the HGW 51 to the portal server 4 asynchronously with respect to the respective sequences described above so that the newest equipment information is registered and updated into the online management table 309a.

Figure 16:
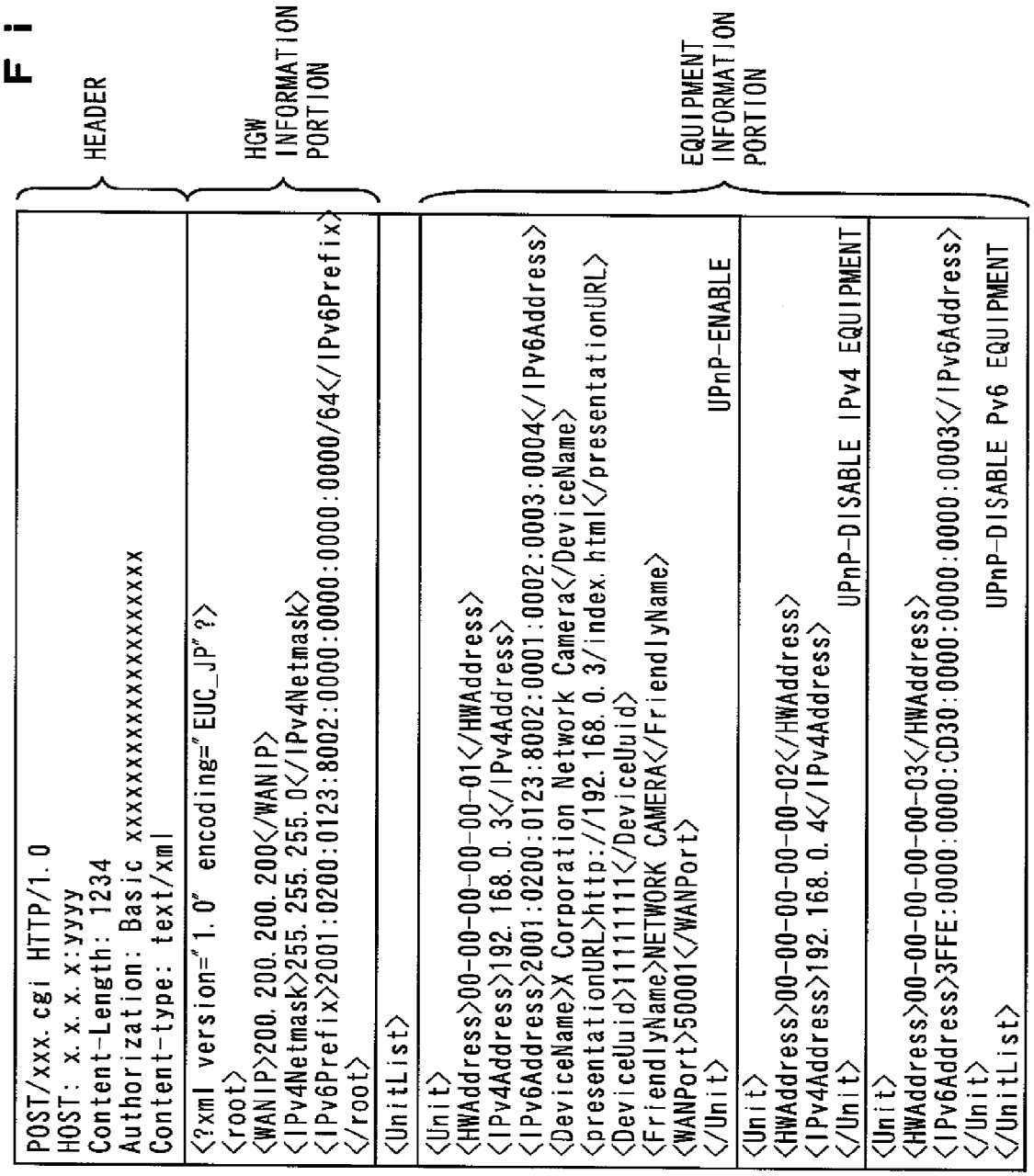
FIG. 16 is a diagram of an example of a message format in a case where HTTP is used for making a request for registering consumer equipments of different attributes into the portal server.

FIG. 16 is a diagram of an example of a message format in a case where HTTP is used for making the request for equipment information registration into the portal server 4. By adding a <Unit> tag inside the <UnitList> tag, the contents of the information management table that have been updated the last by the HGW 51 can be registered in a batch into the portal server 4 with a single registration request. In regard to pieces of consumer equipments that are enabled for both IPv4 and IPv6, an operating screen is preferably presented using the MAC address as a key for resolving duplication at the portal server 4 to prevent duplicated registration.

A procedure for remote operation of the respective pieces of consumer equipment by the mobile terminal 8 in FIG. 1 shall now be described. When a user operates the mobile terminal 8 and accesses the portal server 4 by inputting the URL notified in advance from the ISP, a login screen appears on the display panel of the mobile terminal as shown for example in FIG. 17A. Here, when the user inputs the user account and password provided in advance from the ISP, user authorization by the above-described user authorization unit 307 is performed. When the user is confirmed to be a valid user, the user-equipment association unit 310 searches the online management table 309a using the above-described account and password as search keys, and the newest equipment information are provided along with the HGW information to the mobile terminal 8.

Figures 17A, 17B, 18A, 18B:
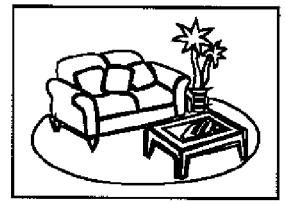
FIG. 17 is a first diagram of display example of a remote operating screen of a mobile phone (8).
FIG. 18 is a second diagram of display example of a remote operating screen of a mobile phone (8).

FIG. 17B and FIG. 18A are diagrams of examples of equipment information display on the mobile terminal 8 and, as shown in FIG. 17B, if the consumer equipments are not connected to the home network or are in the power OFF state even if connected, the equipment information are not displayed. If even a single piece of consumer equipment is connected, the identification information thereof is displayed in a list. Here, if the pieces of above-described detected consumer equipment are UPnP-enabled, because the Friendly Names of the respective pieces of consumer equipment are provided in advance as the equipment information, "Network camera" and "DVD recorder," which are the friendly Names of the pieces of respective consumer equipment, are displayed as link character strings in the list as shown for example in FIG. 18A.

In the present embodiment, the reference address of the link character string, "network camera," is, for example, "http://100.101.102.103:8080-_/http: 200.200.200.200.50001." "100.101.102.103:8080" is the address of the portal server 4, the character string "-_-" is a code indicating transfer of the operation request, addressed to the portal server, to the HGW 51, "200.200.200.200" is the WAN side IPv4 address of the HGW 51, and "50001" is the port number that the HGW associates with the presentation URL of the home equipment (network camera 55). The reference address of "DVD Recorder" is, for example, "http://100.101.102.103:8080-_-/http:200.200.200.200.50002."

Figure 21:
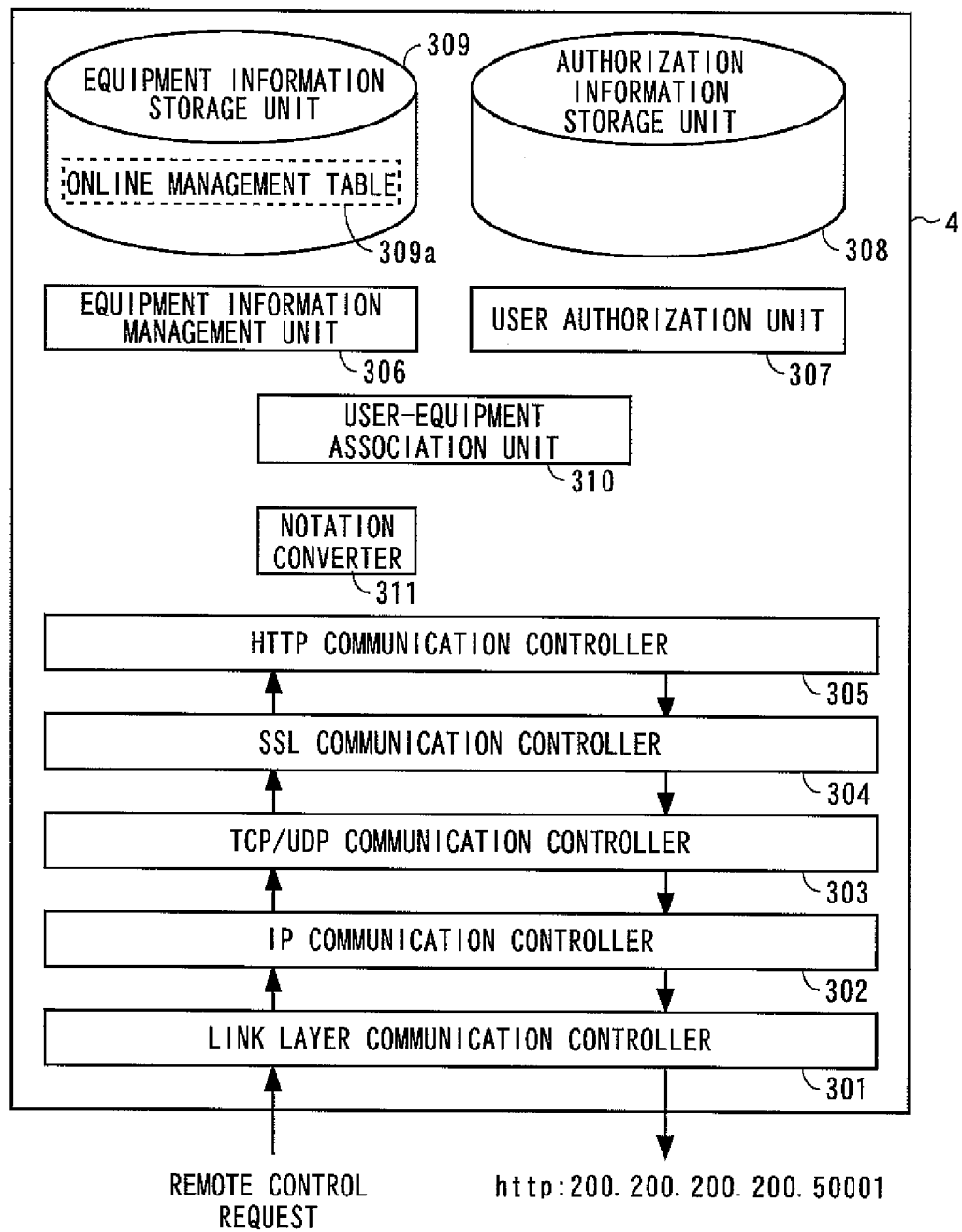
FIG. 21 is a block diagram of the portal server for describing an equipment information remote operation procedure.

When the user clicks "Network camera" on the screen, the above-described remote operation request arrives at the portal server 4, specified by "http://100.101.102.103:8080" as shown in FIG. 21. At the portal server 4, the above-described character string, "-_-," is interpreted as a redirect command for the operation request at the HTTP communication controller 305, and the operation request is transmitted to the HGW 51, specified by the above-described "http: 200.200.200.200:50001."

Figure 22:
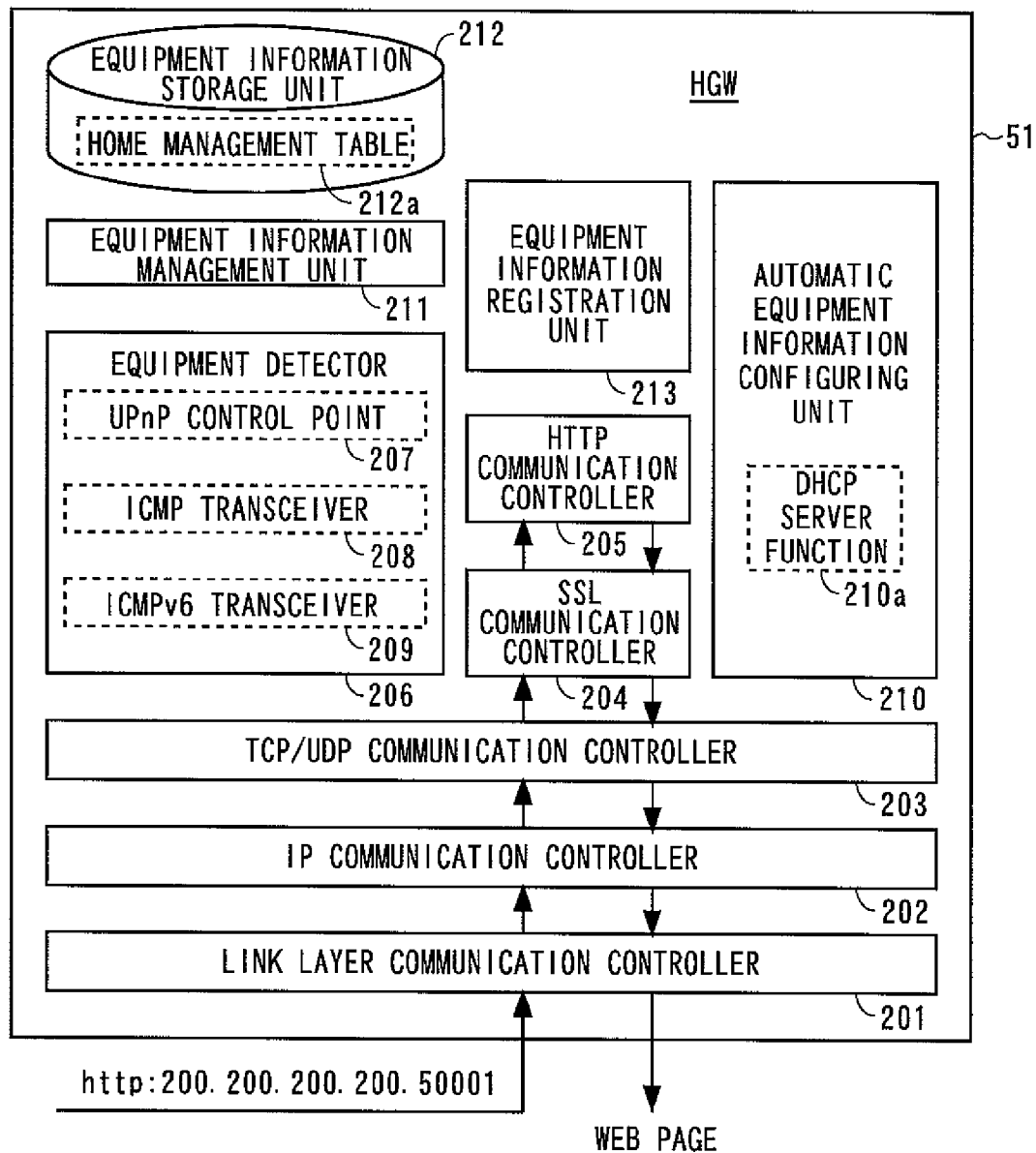
FIG. 22 is a block diagram of the HGW (51) for describing the equipment information remote operation procedure.

At the HGW 51, the presentation URL of the consumer equipment that is associated with port number "50001" specified by the port mapping method in the HTTP communication controller 205 as shown in FIG. 22. In the present embodiment, as was described in relation to FIG. 6 above, "1192.168.0.3:8080", is allocated as the presentation URL to the network camera 55. The consumer equipment designated by this URL transmits back a Web page for remote operation.

FIG. 18B is a diagram of an example of a remote operation screen displayed on the mobile phone 8, and in this remote operation screen, a plurality of link character strings and link symbols are displayed according to the operation details. When the user clicks a link character string or link symbol according to a desired operation detail, the operation instruction thereof is transmitted via the portal server 4 and HGW 51 to the network camera 55, and an application program of the network camera 55 that awaits for operation requests at port "8080" executes control of the network camera 55 in accordance to this operation.

Figure 19A:
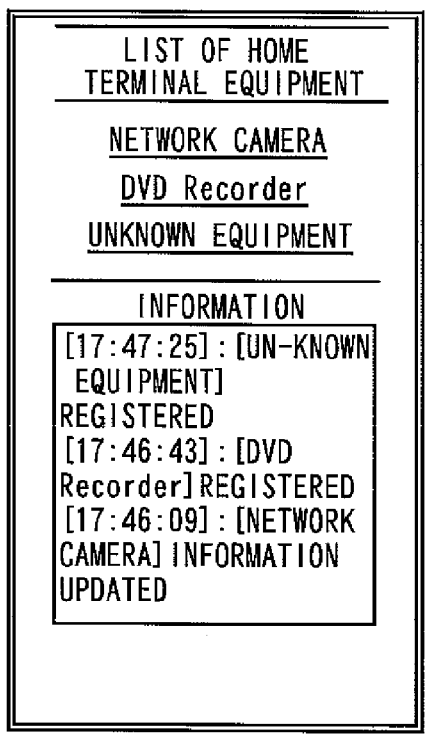
FIG. 19 is a third diagram of display example of a remote operating screen of a mobile phone (8).

When a UPnP-disabled entrance camera is thereafter connected anew to the home network or put in the power ON state and this is automatically detected by the HGW 51, home management table 212a of this HGW 51 is updated and the online management table 309a of the portal server 4 is also updated automatically. When the user performs updating of the list of home terminal equipment, the identification information of the newly detected entrance camera is added to the list display. However, because the entrance camera is UPnP-disabled and the Friendly Name thereof is not provided, the link character string thereof becomes "UNKNOWN EQUIPMENT" as shown in FIG. 19A. Ina case where plurality pieces of UPnP-disabled consumer equipment are detected, the link character strings of the respective equipments will be "UNKNOWN EQUIPMENT 1," "UNKNOWN EQUIPMENT 2," . . . "UNKNOWN EQUIPMENT n."

Figure 19B:
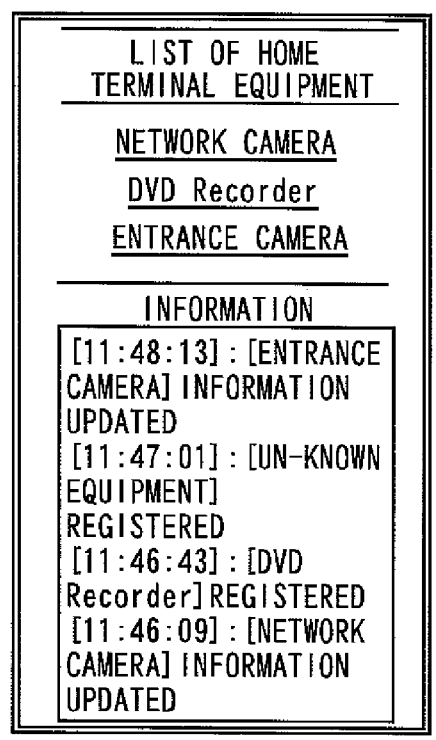

Here, if the user requests the portal server 4 to change the link character string "UNKNOWN EQUIPMENT" to "Entrance camera," the MAC address of the entrance camera becomes associated with the character string, "ENTRANCE CAMERA," at the notation converter 311. As a result, the link character string, "ENTRANCE CAMERA," is thereafter allocated to the MAC address of the entrance camera, and thus on the screen of the mobile phone 8, the link character string, "UNKNOWN EQUIPMENT," is changed to "ENTRANCE CAMERA" for improved readability as shown in FIG. 19B.

Figure 20A:
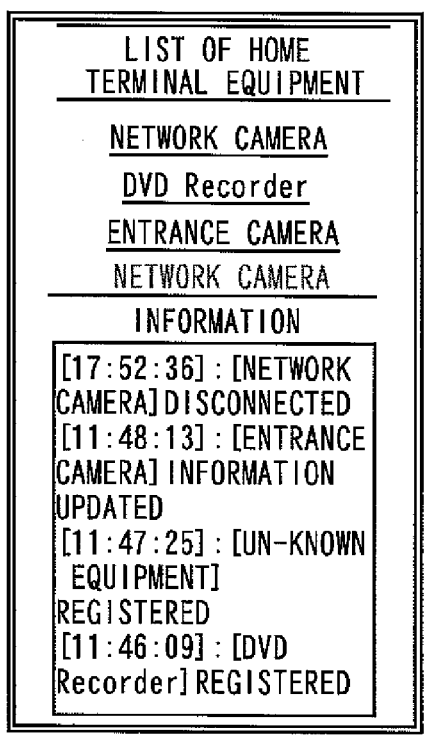
FIG. 20 is a fourth diagram of display example of a remote operating screen of a mobile phone (8).
Figure 20B:
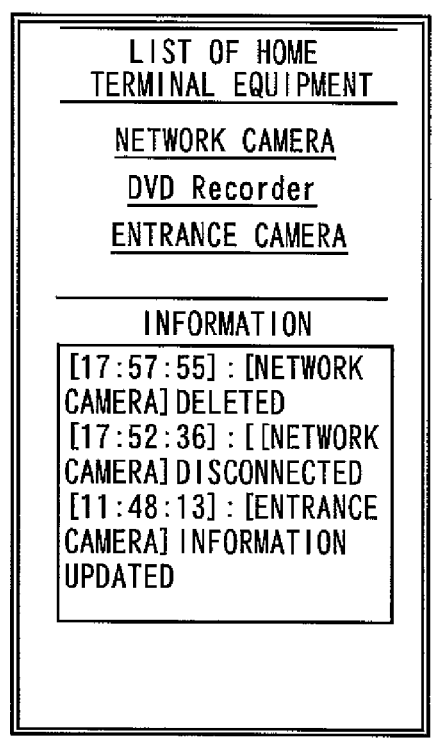

If the network camera 55 is thereafter disconnected from the home network or is put in the power OFF state while being connected, the home management table 212a of the HGW 51 is updated automatically, and furthermore, the online management table 309a of the portal server 4 is updated. At online management table 309a, the entry of the network camera 55 that is no longer detected on the home network is not immediately deleted by the updating but is placed under the monitoring and the number of times in which the network camera is not detected is counted. During this process, the link character string, "NETWORK CAMERA," is grayed out (disabled for operation) and moved to the lowest row on the screen of the mobile phone 8 as shown, for example, in FIG. 20A. If the network camera 55 is then undetected consecutively for a predetermined number of times of updating, the entry of the network camera 55 is deleted from the online management table 309a. Consequently, on the screen of the mobile phone 8, the above-described link character string, "NETWORK CAMERA," is completely erased from the screen as shown in FIG. 20B.

What is claimed is:

1. A consumer equipment remote operation system for performing, via a network, remote operation of consumer equipment connected to a home network, the consumer equipment remote operation system comprising:
   a home gateway that connects the home network to a wide-area network;
   servers that set network configurations including an address for the home gateway; and
   a portal server that is installed on the wide-area network;
   wherein the home gateway includes:
   a storage unit to store a home management table that manages equipment information on the consumer equipment connected to the home network;
   an equipment detector that cyclically sends a detection request message along the home network to detect consumer equipment and acquires the equipment information of the detected consumer equipment;
   an equipment information management unit that performs updating registration of the equipment information on the detected consumer equipments into the home management table;
   a configuring unit that makes network configurations for newly detected consumer equipments; and
   an equipment information registration unit that cyclically transmits the equipment information in the home management table, address information of the home gateway, and information of a user to the portal server installed on the wide-area network at a cycle that differs from the cycle at which the equipment detector detects and acquires the equipment information of the detected consumer equipment and a global address of a wide area network side interface of the home gateway is dynamically changed and unknown to the user,
   wherein the portal server includes:
   a storage unit that stores an online management table to manage the information, cyclically transmitted from the home gateway, according to each user;
   a user authorizing unit that receives an authorization request transmitted from a user via the wide-area network;
   a user-equipment association unit that extracts equipment information, associated with an authorized user, from the online management table;
   a notation conversion processor that converts the equipment information extracted from the online management table to a notation of high readability;
   a transmitter that transmits, via the wide-area network, the equipment information that have been changed in notation with a reference address information of the portal server to the user;
   a controller that receives a remote operation request to a reference address and transfers a remote control request to the home gateway, wherein
   the reference address information includes an address of the portal server, a code indicating transfer of the operation request to the home gateway, an address of the gateway, and a port number associated to the consumer equipment corresponding to the equipment information.

2. The consumer equipment remote operation system according to claim 1, wherein the home gateway further comprising:
   a transceiver unit that transmits a description request to UPnP-enabled consumer equipment on the home network and receives detailed information on the consumer equipment based on response messages transmitted back in response to the description request; and wherein the equipment information management unit updatingly registers the detailed information as a portion of the equipment information into the home management table.

3. The consumer equipment remote operation system according to claim 1, wherein the equipment detector comprises: a UPnP control point that transmits and receives M-SEARCH, defined by UPnP, as the detection request message and the response message for the detection request.

4. The consumer equipment remote operation system according to claim 1, wherein the equipment detector comprises: an ICMP transceiver that transmits ICMP ECHO as the detection request message and the response message for the detection request.

5. The consumer equipment remote operation system according to claim 1, wherein the equipment detector comprises: an ICMPv6 transceiver that transmits ICMPv6 ECHO as the detection request message and the response message for the detection request.

6. The consumer equipment remote operation system according to claim 1, wherein, of the equipment information already registered in the home management table, the equipment information of consumer equipments that are undetected consecutively in a predetermined period are deleted.

7. The consumer equipment remote operation system according to claim 1, wherein, of the equipment information already registered in the online management table, the equipment information of consumer equipments that are undetected consecutively in a predetermined period are deleted.

8. A method for operating a consumer equipment remote operation system, in which a home network is connected via a home gateway to a wide-area network, a portal server is positioned on the wide-area network, and consumer equipments connected to the home network are remote operated via the network; the consumer equipment remote operation system operating method comprising:
a first procedure, wherein the home gateway transmits a detection request message along the home network;
a second procedure, wherein the home gateway acquires equipment information on the consumer equipments, connected to the home network, based on detection response messages that are transmitted back in response to the detection request message;
a third procedure, wherein the home gateway updatingly registers already-registered equipment information based on the acquired equipment information;
a fourth procedure, wherein the home gateway sets network configurations for newly detected consumer equipments;
a fifth procedure, wherein the home gateway sets network configurations, including an address, for itself;
a sixth procedure, wherein the home gateway cyclically repeats the first to third procedures; and
a seventh procedure, wherein the home gateway cyclically transmits the registered equipment information, address information of the home gateway, and information of a user to the portal server installed on the wide-area network at a cycle that differs from the cycle at which the home gateway repeats the first to third procedures and a global address of a wide area network side interface of the home gateway is dynamically changed and unknown to the user,
a procedure, wherein the portal server manages the information, cyclically transmitted from the home gateway, according to each user on an online management table;
a procedure, wherein the portal server receives an authorization request transmitted from a user via the wide-area network;
a procedure, wherein the portal server extracts equipment information, associated with an authorized user, from the online management table;
a procedure, wherein the portal server converts the equipment information extracted from the online management table to a notation of high readability;
a procedure, wherein the portal server transmits, via the wide-area network, an equipment information that have been changed in notation with a reference address information of the portal server to the user;
a procedure, wherein the portal server receives a remote operation request to a reference address and transfers a remote control request to the home gateway, wherein
the reference address information includes an address of the portal server, a code indicating transfer of the operation request to the home gateway, address of the gateway, and a port number associated to the consumer equipment corresponding to the equipment information.

9. The consumer equipment remote operation system operating method according to claim 8, wherein the home gateway executes the first to seventh procedures upon detecting a predetermined event.

10. The consumer equipment remote operation system operating method according to claim 8, further comprising:
a procedure of transmitting, when a UPnP-enabled consumer equipment is detected, a description request, defined by UPnP, to the consumer equipment; and
a procedure of acquiring detailed information on the consumer equipment based on the response message for the description request; and
wherein the detailed information are registered as a portion of the equipment information.

11. The consumer equipment remote operation system operating method according to claim 8, wherein the detection request message is an M-SEARCH request.

12. The consumer equipment remote operation system operating method according to claim 8, wherein the detection request message is an ICMP ECHO request.

13. The consumer equipment remote operation system operating method according to claim 8, wherein the detection request message is an ICMPv6 ECHO request.

14. The consumer equipment remote operation system operating method according to claim 8, wherein the first to fourth procedures are repeated while an M-SEARCH request, an ICMP ECHO request, and an ICMPv6 ECHO request are transmitted as the detection request messages.

* * * * *